Patented Jan. 5, 1943

2,307,053

UNITED STATES PATENT OFFICE 2,307,053

ISOMERIZATION OF N-PARAFFIN

Charles S. Lynch, Fanwood, N. J., assignor to Standard Oil Development Company, a corporation of Delaware No Drawing. Application December 31, 1940, Serial No. 372,495

7 Claims. (Cl. 260—676)

This invention relates to the isomerization of paraffinic hydrocarbons by means of a novel process and novel utilization of aluminum halide isomerization catalyst masses. In particular, this process relates to the conversion of straight chain or normal paraffins into branched chain or isoparaffins.

The isomerization of normal paraffins of higher molecular weight than propane into their corresponding isomers or branched chain homologues is already well known. For effecting such desired reaction it is customary to employ metal halide, for example, the chlorides, bromides, and the like, in conjunction with hydrogen halides, such as hydrogen chloride or hydrogen bromide. The metal halides employed are usually derived from the metals, aluminum, zinc, iron, zirconium, tin, antimony, columbium, tantalum and boron. These compounds vary in their effectiveness depending upon the particular paraffin to be isomerized and upon the reaction conditions to be employed. However, in many instances their catalytic activity varies greatly, not only as between the various metal halides but also as between the various reaction conditions and types of feed stocks employed when these various metal halides are the catalyst. In fact, some of these metal halides are wholly unsuited for use with particular feed stocks while others are entirely desirable. Zinc chloride, although promoting or effectuating the desired reaction in many instances, is known to be one of the least desirable of the metal halides employed for the isomerization of paraffinic hydrocarbons.

The present invention is concerned with a novel process for more effectively utilizing the inherent variation in catalytic activity for isomerization of the various aluminum halides in the presence of the conventional promoters. It has been discovered that in the isomerization of straight chain paraffins to the corresponding branched chain isomers, when using one or more of the aluminum halides, that previously unused aluminum halide has substantially a different degree of catalytic activity than the same aluminum halide when employed after having been previously employed in activating isomerization reaction. In other words, the type of isomerization as well as the degree of isomerization markedly varies depending upon the age of the aluminum halide employed in the particular reaction, and depending upon the type of feed stock in contact therewith. The process of the present invention is based upon this discovery and resides in the novel method of utilizing this discovery to obtain to the fullest advantage, the isomerization of normal paraffins to isoparaffins, while at the same time taking advantage of the isomerization activity of previously unused aluminum halide for their entire effective catalyst life.

It has previously been supposed that previously unused, that is, fresh, aluminum halide is probably the most reactive catalyst for an isomerization of normal paraffins to isoparaffins. It has also previously been supposed that coupled with the greatest activity of the catalyst for isomerization, that there is also a tendency for the catalyst to promote a simultaneous cracking process to only a slightly lesser degree. It has previously been considered that the cracking tendency of aluminum halide isomerization catalysts tended to decrease with the increasing age of the catalyst, together with the attendant accumulation of degradation products of that catalyst in and closely associated with the catalyst mass. Contrary to the prior supposition, it has now been discovered that relatively fresh or previously unused aluminum halide does not have any great tendency to promote cracking of even the higher straight chain paraffins, but that the tendency becomes greater the longer the aluminum halide is used as an isomerization catalyst and the longer the straight chain of the paraffin molecules present in the feed stock when the catalyst has become aged by continued usage. The novel process relates to the use of previously unused or fresh aluminum halide, in particular, aluminum chloride in the presence of a hydrogen halide or its chemical equivalent, such as, for example, the lower alkyl halides, water, chlorine or carbon tetrachloride and the like, in particular, hydrogen chloride, for isomerizing normal paraffins of higher molecular weight and having the greater tendency toward substantial cracking under the isomerization reaction conditions obtaining until such time as it appears that substantial cracking is occurring or is about to occur, followed by employing this partially spent aluminum chloride catalyst mass under either the same or other suitable isomerization reaction conditions as an isomerization catalyst for isomerizing normal paraffins of lower molecular weight and having a lesser tendency toward substantial cracking. For example, it is possible to employ normal heptane or some other higher straight chain homologues thereof as the feed stock for the first portion of the reaction and after the catalyst mass has become sufficiently degraded to the point where substantial cracking is taking place, it is then possible to employ either the same or other optional and optimum reaction condition but change the feed stock to, say for example, normal butane, and continue the process until the useful catalyst life has been completely consummated.

The present invention contemplates not only the carrying out of a two-step process as above described, but contemplates as well the carrying out of a three-step process, as for example, in the first portion of the process normal heptane would be employed as the feed stock followed by the use of normal pentane and lastly the use of normal butane until the catalyst life has been entirely realized.

As will be hereinafter pointed out more fully, the basic process of the invention is susceptible to a number of variations or modifications. It is possible to carry out the process of the present invention in a single reactor maintained under reaction conditions so selected as that they need not be changed regardless of the feed stocks employed. In other words, the same reaction condition, if properly selected, may be employed in isomerizing, for example, normal pentane as are employed for isomerizing a subsequent spent catalyst therefrom for normal butane. However, such a process is not always to the best advantage from a commercial standpoint because of the fact that neither the isomerization of normal pentane nor the isomerization of normal butane is carried out under optimum conditions for either type of reaction. Hence a longer period of contact for the desired degree of conversion of the normal butane is required and a shorter period of contact for the desired degree of conversion of normal pentane is required and in addition the normal pentane is more likely to commence to undergo substantial cracking in a shorter period of time than would be the case under operating conditions optimum therefor. If desired, therefore, two or more reactors may be maintained in operating the process wherein one reactor is maintained under optimum conditions for a feed stock least suited to be contacted with the catalyst in a somewhat degraded state of activity and another reactor is maintained under optimum conditions for a different feed stock using the catalyst composition therein that has a different degree of activity from the first mentioned reactor. In other words, the process may be carried out in such a manner that optimum conditions for a particular feed stock are maintained in a particular reactor depending upon the degree of activity of the catalyst contained in that reactor and provision may be made for manifolding the feed stocks to a number of reactors as the condition of the catalyst warrants the particular feed going thereto. Another variation of the process is to permit the feed to any particular reactor to remain constant, that is, normal butane to one reactor, normal pentane to another, and, as the previously unused catalyst which has been fed to the normal pentane reactors becomes sufficiently spent to influence and activate substantial cracking, the catalyst may be conveyed from the C5 reactor to the C4 reactor, thereby avoiding any necessity for changing reaction conditions with respect to any particular reactor or feed stock. Such a system appears to be more suitable when the reaction conditions are different for each feed stock and each activity of the catalyst mass.

The following table represents a series of runs which were made to determine the catalytic activity of aluminum chloride isomerization catalysts upon, and with reference to, a number of different types of feed stocks, in particular, normal butane and normal pentane.

TABLE I

ISOMERIZATION REACTION CONDITIONS USING AlCl₄ CATALYST

| Feed | n-Heptane | n-Pentane | n-Butane |
|---|---|---|---|
| Wt. per cent HCl | 4.5-25 | 3-22 | 2-20 |
| Reaction time, hrs | 0.5-8.5 | 0.5-9.5 | 0.5-25.0 |
| AlCl₃ conc. wt. per cent | 75-150 | 65-150 | 10-150 |
| Temp. F | 30-100 | 40-125 | 75-350 |

NOTE.—The weight percentages are based on total hydrocarbon present in the reactor at any one time.

Both types of processes may be carried out either as a batch operation or they may be carried out in a continuous manner. From the standpoint of commercial operation, the continuous process is much preferred over the batch-type operation. In the batch operation, successive charges of normal butane or normal pentane, whichever the case might be, were made to the catalyst mass under the reaction conditions until such time as the catalyst mass was no longer active for isomerization. It might therefore be said more appropriately, that from the standpoint of the catalytic activity of aluminum chloride for isomerization, the batch runs were more or less semicontinuous because of the fact that the original catalyst mass was not changed throughout any particular series of runs as recorded by the following table. Other runs, in particular those with normal pentane were carried out on a continuous basis. In all cases, the percentages are given by weight based upon the feed and total hydrocarbons present in the reaction zone at any one time. All reaction zones were maintained under sufficient superatmospheric pressure to insure liquid phase operation under the reaction conditions and the reaction mixture was agitated to insure thorough contact with the catalyst mass throughout the reaction time. The normal butane employed as a feed stock contained 0.7% of C₃ hydrocarbons, 0.3% of iso C₄ hydrocarbons, 98% of normal butane and 1% of C₅ and heavier hydrocarbons. This feed was entirely paraffinic in nature. The produce analyses in the following table represent a composite of a number of samples taken during the indicated number of batches or number of hours.

TABLE II

BATCH BUTANE ISOMERIZATION (2870 gms.) 100 wt. per cent AlCl₃, temp. 225° F., feed n-butane

| | Batch No. | | | | | | | |
|---|---|---|---|---|---|---|---|---|
| | 1 | 3 to 7 | 17 to 20 | 47 to 50 | 73 to 76 | 102 to 105 | 132 to 138 | 151 to 165 |
| Hrs. contact (per batch) | 0.5 | 2 | 2 | 2 | 2 | 2 | 2 | 2 |
| Per cent HCl | 2 | 2 | 2 | 2 | 2 | 3 | 5 | 10 |
| Product per cent: | | | | | | | | |
| C₃ | 3 | 3 | 2 | 3 | 4 | 2 | 5 | 2 |
| Iso C₄ | 35 | 45 | 44 | 48 | 27 | 44 | 38 | 35 |
| C₅+ | 2 | 2 | 2 | 2 | 2 | 3 | 2 | 2 |
| n-Butane reacted | 38 | 48 | 46 | 51 | 31 | 47 | 43 | 37 |
| Selectivity | 92 | 94 | 96 | 94 | 87 | 94 | 88 | 94 |

It will be noted in Table 2 that even after a total usage of some 300 hrs. of operation, the catalyst mass had a selectivity with respect to the n-butane reacted from 88–94 with only a slight increase in the amount of hydrogen chloride employed in the reaction mixture, all other conditions being the same as originally used with the previously unused aluminum chloride catalyst.

TABLE III

Continuous Bed Type Reactor

*Reactor volume 400 cc.—400 lbs./sq. in. pressure (about 400 gms. AlCl₃)—feed n-butane*

|  | Total hours operation | | | | | |
| --- | --- | --- | --- | --- | --- | --- |
|  | 0 to 12 | 24 to 72 | 144 to 192 | 288 to 300 | 396 to 420 | 440 to 462 |
| Feed rate V/V/hr | 0.5 | 0.5 | 0.54 | 0.58 | 0.49 | 0.50 |
| Wt. percent HCl | 26.4 | 20.7 | 21.3 | 12.9 | 20.2 | 16.0 |
| Temp. °F | 150 | 150 | 150 | 150 | 150 | 175 |
| Product: | | | | | | |
| Percent C₃ | 0.8 | 1.7 | 5.0 | 3.2 | 3.7 | 5.0 |
| Percent Iso C₄ | 44.3 | 59.6 | 43.4 | 38.4 | 36.4 | 45.0 |
| Percent C₅+ | 1.6 | 2.5 | 2.8 | 1.8 | 2.7 | 3.4 |
| Percent n-C₄ reacted | 44.6 | 61.7 | 52.2 | 41.3 | 40.7 | 41.3 |
| Selectivity | 100 | 98 | 92 | 94 | 91 | 89 |

In Table 3 it is even more apparent that even after as long as 400 hrs. of continuous operation using the same catalyst bed, the percentage of n-butane reacting and the percentage of the reacted n-butane going to isobutane remain only very slightly lower than that originally reacted with the fresh aluminum chloride catalyst.

TABLE IV

*Type of reaction—continuous—mild conditions—feed: n-pentane; HCl—1.5%; initial catalyst 100% fresh AlCl₃ (375 gms.) temp. 86° F.*

|  | Total hours operation | | | |
| --- | --- | --- | --- | --- |
|  | 2–3 | 5–6 | 8–9 | 12–13 |
| Contact time, hrs | 3 | 3 | 3 | 3 |
| Product: | | | | |
| Percent C₄ | 0 | 4 | 8 | 16 |
| Percent Iso C₅ | 19 | 42 | 47 | 43 |
| Percent C₆+ | 0 | 3 | 7 | 15 |
| Percent n-C₅ reacted | 19 | 49 | 62 | 74 |
| Selectivity | 100 | 86 | 76 | 58 |

TABLE V

*Type of reaction—continuous—turbomixer—drastic conditions—feed: n-pentane; HCl—6%; temp. 75° F., initial cat. AlCl₃ 100% (1000 gms.)*

|  | Period—hours | | | | | |
| --- | --- | --- | --- | --- | --- | --- |
|  | 1 | 2 | 3 | 4 | 5 | 6 |
| Actual contact time, hrs | 1.1 | 0.93 | 1.07 | 1.45 | 1.64 | 1.68 |
| Product: | | | | | | |
| Percent C₄ | 1 | 0 | 0 | 3 | 8 | 13 |
| Percent Iso C₅ | 1 | 22 | 26 | 59 | 66 | 45 |
| Percent C₆+ | 1 | 0 | 0 | 2 | 6 | 10 |
| Percent n-C₅ reacted | 1 | 22 | 26 | 64 | 80 | 68 |
| Selectivity | 1 | 100 | 100 | 92 | 83 | 66 |

Tables 4 and 5 present data from runs made with n-pentane as a feed stock. Table 4 having been under mild conditions and Table 5 having been under more drastic or severe conditions. It will be noted that in each case the n-pentane underwent very little degradation or cracking in the first stages of the aluminum chloride catalyst used therein, but that after a substantial length of time in which the aluminum chloride had been employed in the isomerization of n-pentane, even though the feed was substantially pure n-pentane, nevertheless, substantial amounts of cracking were evident.

TABLE VI

*Type of reaction—batch—time of contact—4 hrs. per batch. Temp. 85° F. Fresh AlCl₃ 100% (150 gms.). Feed—n-pentane*

|  | Batch No. | | | |
| --- | --- | --- | --- | --- |
|  | 1 | 2 | 3 | 4 |
| Percent HCl | 7.3 | 9.3 | 10.0 | 7.4 |
| Product: | | | | |
| Percent C₄ | 0 | 12 | 44 | 53 |
| Percent Iso C₅ | 19 | 50 | 27 | 18 |
| Percent C₆ | 0 | 10 | 16 | 12 |
| Percent n-C₅ reacted | 19 | 72 | 87 | 83 |
| Selectivity | 100 | 70 | 32 | 22 |

From Tables 2 and 3 it is observed that n-butane isomerization proceeds uniformly for 165 batches on the same catalyst charge or for 440 hours of continuous operation without loss of selectivity. If on the other hand, n-pentane feed is used (Tables 4 to 6) the reaction becomes less selective after only 2 to 4 complete changes of feed even under mild operating conditions. For this reason, fresh aluminum halide is used to isomerize the more easily cracked hydrocarbon and the partially used catalyst for n-butane isomerization which is less easily cracked.

No special type of apparatus is necessary in carrying out the process of the present invention, it being sufficient to use the apparatuses, such as autoclaves, turbomixers, and the like, which have heretofore been employed for the isomerization of n-paraffins using aluminum halides and promoters for the reaction act of activation. The equipment, however, should be so designed as to withstand sufficient superatmospheric pressure to insure the liquid phase operation at all times. This is deemed advisable by reason of the fact that it is desired to provide agitation of the liquid with the catalyst in order to insure adequate contact of the catalyst with the same. Jets of restricted internal diameter, turbomixers, mechanical agitators, and the like, are all suitable methods of mechanically contacting intimately the reactants with the catalyst. Best results in practicing the present invention are obtained if substantially pure paraffins are fed to the reactor or reactors under any given set of reaction conditions. However, paraffinic mixtures containing relatively small amounts of other paraffins or very small amounts of olefins may be employed with considerably less advantageous results.

The various feed stocks may comprise essentially normal butane, normal pentane, normal hexane, normal heptane, and the higher homologues. Such feeds as field butane, casinghead gasoline, and the like, are also suitable. However, it is preferred to employ as nearly as possible single paraffin hydrocarbons as feed stocks for the reaction process herein outlined. At times it is also desirable to employ free or elemental hydrogen in connection with the use of the previously unused aluminum chloride with the feed stocks having the greatest susceptibility to cracking. The elemental or free hydrogen appears to suppress to some extent this tendency to crack, thereby enabling the freshly used aluminum chloride catalyst to undergo a longer useful catalyst life in the first stages of the process than was heretofore expected without the use of elemental or free hydrogen.

A suitable isomerization reactor has charged thereto powdered aluminum chloride, hydrogen chloride, and normal pentane, the amount of the aluminum chloride constituting about 100% by weight of the normal pentane charged and the amount of the hydrogen chloride constituting about 20% by weight of the normal pentane charged. The temperature of the reactor is kept at 75° F. for a period of about two hours with respect to any one particular batch of normal pentane contacting the catalyst under the reaction conditions at any one time. The aluminum chloride is fresh catalyst and has not previously been used in any chemical reaction. The initial product of the reaction coming from this reaction was found to contain about 76 to about 78% of isopentane and it was found that between about 80% and 82% of the normal pentane had reacted. This gave a selectivity of at least 95%. After subjecting this catalyst mass to operate in this fashion for no more than from six to seven hours total contact time, it is usually desirable to transfer the catalyst to another reactor having fed thereto normal butane, since the product in the normal pentane reactor at the end of this period contains between about 65 and about 75% of isopentane being formed with between about 80 and about 90% of the normal pentane reacting with the catalysts at this age and activity. This represents a somewhat lower selectivity. The normal butane reactor, however, is maintained as follows:

Based upon the amount of normal butane present in the reactor at any one time the aluminum chloride from the previous normal pentane reactor is present in the normal butane reactor in an amount between about 50 and about 100%, hydrogen chloride is present in an amount between about 3% and about 5%, the temperature of the reaction chamber is maintained between about 150 and 175° F., and any particular batch of normal butane is kept in contact with the catalyst under the reaction conditions obtained for between about 3½ and about 4 hours. The initial reactive mixture coming from this reaction zone was found to contain between about 42 and about 46% of isobutane, with between about 46 and about 50% of the normal butane contacted therewith having undergone reaction. At the end of continued usage of between about 500 and about 600 hours with the same catalyst and under the same reaction conditions, or under slightly more drastic reaction conditions, such as a slight increase in hydrogen chloride concentration or a slight increase in temperature, the product coming from the normal butane isomerization zone contained between about 35% and about 40% of isobutane with between about 40% and about 45% of the normal butane sent to the reaction zone undergoing reaction.

In another specific modification of the process of the present invention, wherein the process is carried out either batch or continuous using either a single reactor or a plurality of reactors arranged in parallel and fitted with suitable manifolding means for introducing promotor and feed stocks, normal pentane was charged to an isomerization reactor containing about 100% by weight of fresh aluminum chloride, about 5% by weight of hydrogen chloride maintained at a temperature of about 110° F., with a period of contact of the normal pentane under these reaction conditions with the catalyst mass of about ¾ hour. The reaction product coming from this reaction zone was found to contain between about 70% and about 80% of isopentane, and the normal pentane was reacting to the extent of about 80% to about 90%. This operation was continued so that the total catalyst life from the fresh addition thereof to the reaction zone amounted to not more than about three hours. Again this time, the product emanating from the reaction zone was found to be about 50% to 60% isobutane, with about 85% to about 95% of normal pentane reacting. From a commercial standpoint, continued usage of this partially spent aluminum chloride catalyst for normal pentane isomerization is not economical, although the process might be continued for the life of the catalyst or in a process where the normal pentane feed might be stopped at between 1½ to 2 hours if desired.

At the end of the two-hour period as above indicated the feed to the reaction zone is changed from normal pentane to normal butane, while all of the other conditions of the reaction remain constant in the reactor except that the throughput is reduced to give a contact time for the normal butane in the reaction zone under the reaction conditions obtaining, of about twenty-two hours in place of the ½ hour contact time for the normal pentane. The product initially formed with the new feed of normal butane comprises between about 35% and about 40% of isobutane with about 40% to about 50% of the normal butane reacting. The continued feeding of normal butane into this catalyst mass continuously over a period of as long as 500 hours may be economically maintained, and even at the end of this time, the product distribution is substantially unchanged from that initially formed when the first quantities of normal butane were contacted with the catalyst. If desired, however, the amount of hydrogen chloride may be increased slightly if there is need for maintaining a substantially constant conversion. Likewise, the temperature may be slightly increased so as to offset the gradual decreasing of catalyst activity.

Having now thus fully described and illustrated the character of the invention, what is claimed as new and useful and desired to be secured by Letters Patent is:

1. A process which comprises isomerizing a straight chain paraffin containing at least five carbon atoms per molecule under isomerization reaction conditions in the presence of a fresh aluminum halide and in the presence of a promoter, continuing to carry out the process with the same batch of catalysts until such time as the effluent from the reaction zone indicates substantial cracking imminent, then employing the aforementioned catalyst mass in the presence of a promoter as an isomerization catalyst for isomerizing a different straight chain paraffin of lower molecular weight than the first one, and containing between four to six carbon atoms in the molecule under isomerization reaction conditions.

2. A process which comprises isomerizing normal pentane with fresh aluminum chloride and hydrogen chloride under isomerization reaction conditions, continuing to contact normal pentane with the same batch of catalyst until such time as appreciable normal pentane degradation occurs, at which time the aforementioned batch of aluminum chloride catalyst has contacted therewith for the remainder of its useful isomerization life, normal butane under isomerization reaction conditions and recovering in the first phase of the process isopentane from the reacted mixture, and in the second phase of the said process isobutane from the reacted mixture.

3. A process which comprises continuously introducing and contacting normal pentane in the liquid phase with agitation with about 100% by weight of fresh aluminum chloride, about 5% by weight of hydrogen chloride at a temperature of about 110° F. for about 0.75 hour, continuously removing reacted mixture from contact with the catalysts, continuing said process for not longer than about 3 hours while continuously recovering isopentane from the reacted effluent, then discontinuing charging normal pentane to this batch of catalysts but charging instead normal butane under the heretofore stated reaction conditions, but allowing the normal butane to be in contact with the catalysts under the isomerization conditions obtaining for about 22 hours, and recovering isobutane from the reacted effluent.

4. A process which comprises isomerizing normal pentane in the liquid phase with agitation in contact with about 100% by weight of comminuted fresh aluminum chloride, about 20% by weight of hydrogen chloride at a temperature of about 75° F. for about two hours, after no more than about seven hours total usage, transferring this catalyst mass to another isomerization zone, and isomerizing normal butane in the liquid phase with agitation in contact with said catalyst mass in an amount between 50 and about 100% in the presence of about 3% and about 5% by weight of hydrogen chloride at a temperature of between 150 and about 175° F., for about 3.5 and about 4 hours, recovering isopentane from the reacted mixture of the first isomerization zone and isobutane from the reacted mixture of the second named isomerization zone.

5. A process which comprises reacting normal butane under sufficient superatmospheric pressure to maintain liquid phase operation under the reaction conditions obtaining, while agitating the normal butane in the presence of between about 2% and about 22% of its weight of hydrogen chloride at a temperature between about 40 and about 125° F. for a period of time between about 0.5 and about 9.5 hours, in contact with between about 75 and about 150% of the weight of normal butane of a catalyst mass comprising aluminum chloride previously employed as a catalyst in the isomerization of normal pentane to isopentane, and recovering isobutane from the reacted mixture.

6. A process which comprises isomerizing a lower normal paraffin containing at least four carbon atoms per molecule under suitable isomerization reaction conditions in the liquid phase with agitation in the presence of a promoter and a catalyst mass comprising a partially deactivated aluminum halide, previously employed as an isomerization catalyst in isomerizing a normal paraffin having a greater tendency toward degradation than the paraffin of the process.

7. A process as in claim 6, wherein elemental hydrogen is employed.

CHARLES S. LYNCH.